US008239190B2

(12) United States Patent
Kapoor et al.

(10) Patent No.: US 8,239,190 B2
(45) Date of Patent: Aug. 7, 2012

(54) TIME-WARPING FRAMES OF WIDEBAND VOCODER

(75) Inventors: Rohit Kapoor, San Diego, CA (US); Serafin Diaz Spindola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1338 days.

(21) Appl. No.: 11/508,396

(22) Filed: Aug. 22, 2006

(65) Prior Publication Data

US 2008/0052065 A1 Feb. 28, 2008

(51) Int. Cl.

| | |
|---|---|
| ***G10L 21/04*** | (2006.01) |
| ***G10L 11/00*** | (2006.01) |
| ***G10L 21/00*** | (2006.01) |
| ***G10L 19/14*** | (2006.01) |
| ***G10L 15/12*** | (2006.01) |
| *G10L 19/00* | (2006.01) |
| *G10L 15/00* | (2006.01) |

(52) U.S. Cl. ........ 704/203; 704/200; 704/211; 704/220; 704/241

(58) Field of Classification Search .......... 704/200–201, 704/203, 206–211, 214–223, 226–229, 231, 704/236–245, 258, 262–269, E15.001–E15.002, 704/E19.001–E19.008, E19.01, E19.028–E19.029, 704/E19.035–E19.038, E21.001, E21.011, 704/E21.017–E21.018
See application file for complete search history.

(56) References Cited

U.S. PATENT DOCUMENTS 4,216,354 A * 8/1980 Esteban et al. ................ 704/229
4,570,232 A * 2/1986 Shikano ........................ 704/241
4,591,928 A * 5/1986 Bloom et al. ................... 360/13
5,210,820 A * 5/1993 Kenyon ........................ 704/200
5,517,595 A * 5/1996 Kleijn .......................... 704/205
5,594,174 A * 1/1997 Keefe ............................. 73/585
5,598,505 A * 1/1997 Austin et al. .................. 704/226
5,749,073 A * 5/1998 Slaney .......................... 704/278
5,787,387 A * 7/1998 Aguilar ......................... 704/208
(Continued)

FOREIGN PATENT DOCUMENTS

EP 0680033 A2 11/1995
(Continued)

OTHER PUBLICATIONS

Combescure et al. “Voice signal processing.” France Telecom. Ann. Telecommun., vol. 50, No. 1. 1995.*

(Continued)

*Primary Examiner* — Pierre-Louis Desir
*Assistant Examiner* — David Kovacek
(74) *Attorney, Agent, or Firm* — Heejong Yoo

(57) ABSTRACT

A method of communicating speech comprising time-warping a residual low band speech signal to an expanded or compressed version of the residual low band speech signal, time-warping a high band speech signal to an expanded or compressed version of the high band speech signal, and merging the time-warped low band and high band speech signals to give an entire time-warped speech signal. In the low band, the residual low band speech signal is synthesized after time-warping of the residual low band signal while in the high band, an unwarped high band signal is synthesized before time-warping of the high band speech signal. The method may further comprise classifying speech segments and encoding the speech segments. The encoding of the speech segments may be one of code-excited linear prediction, noise-excited linear prediction or ⅛ frame (silence) coding.

36 Claims, 5 Drawing Sheets

Time-Warping of Low-Band and High-Band

U.S. PATENT DOCUMENTS

| | | | | | |
|---|---|---|---|---|---|
| 5,809,455 | A * | 9/1998 | Nishiguchi et al. | 704/214 |
| 5,819,212 | A * | 10/1998 | Matsumoto et al. | 704/219 |
| 5,828,994 | A * | 10/1998 | Covell et al. | 704/211 |
| 5,845,247 | A | 12/1998 | Miyasaka | |
| 5,880,392 | A * | 3/1999 | Wessel et al. | 84/659 |
| 6,233,550 | B1 * | 5/2001 | Gersho et al. | 704/208 |
| 6,477,502 | B1 * | 11/2002 | Ananthpadmanabhan et al. | 704/503 |
| 6,766,300 | B1 * | 7/2004 | Laroche | 704/500 |
| 6,868,378 | B1 * | 3/2005 | Breton | 704/233 |
| 7,024,358 | B2 * | 4/2006 | Shlomot et al. | 704/241 |
| 7,254,533 | B1 * | 8/2007 | Jabri et al. | 704/219 |
| 7,272,556 | B1 * | 9/2007 | Aguilar et al. | 704/230 |
| 7,394,833 | B2 * | 7/2008 | Heikkinen et al. | 370/516 |
| 7,636,659 | B1 * | 12/2009 | Athineos et al. | 704/205 |
| 2001/0023396 | A1 * | 9/2001 | Gersho et al. | 704/220 |
| 2001/0023399 | A1 * | 9/2001 | Matsumoto et al. | 704/262 |
| 2002/0016711 | A1 * | 2/2002 | Manjunath et al. | 704/258 |
| 2002/0111798 | A1 * | 8/2002 | Huang | 704/220 |
| 2002/0120445 | A1 * | 8/2002 | Vafin et al. | 704/241 |
| 2002/0133334 | A1 * | 9/2002 | Coorman et al. | 704/211 |
| 2002/0172395 | A1 * | 11/2002 | Foote et al. | 382/100 |
| 2003/0182106 | A1 * | 9/2003 | Bitzer et al. | 704/207 |
| 2004/0102969 | A1 * | 5/2004 | Manjunath et al. | 704/229 |
| 2004/0156397 | A1 * | 8/2004 | Heikkinen et al. | 370/516 |
| 2004/0181405 | A1 * | 9/2004 | Shlomot et al. | 704/241 |
| 2005/0053130 | A1 * | 3/2005 | Jabri et al. | 375/240 |
| 2005/0131683 | A1 * | 6/2005 | Covell et al. | 704/230 |
| 2005/0137730 | A1 * | 6/2005 | Trautmann et al. | 700/94 |
| 2006/0045138 | A1 * | 3/2006 | Black et al. | 370/516 |
| 2006/0045139 | A1 * | 3/2006 | Black et al. | 370/516 |
| 2006/0077994 | A1 * | 4/2006 | Spindola et al. | 370/412 |
| 2006/0089833 | A1 * | 4/2006 | Su et al. | 704/230 |
| 2006/0122839 | A1 * | 6/2006 | Li-Chun Wang et al. | 704/273 |
| 2006/0184861 | A1 * | 8/2006 | Sun et al. | 714/776 |
| 2006/0206318 | A1 * | 9/2006 | Kapoor et al. | 704/221 |
| 2006/0206334 | A1 * | 9/2006 | Kapoor et al. | 704/267 |
| 2006/0224062 | A1 * | 10/2006 | Aggarwal et al. | 600/413 |
| 2006/0277042 | A1 * | 12/2006 | Vos et al. | 704/223 |
| 2007/0088541 | A1 * | 4/2007 | Vos et al. | 704/219 |
| 2007/0094016 | A1 * | 4/2007 | Jasiuk et al. | 704/219 |
| 2007/0100607 | A1 * | 5/2007 | Villemoes | 704/207 |
| 2007/0282603 | A1 * | 12/2007 | Bessette | 704/219 |
| 2009/0076808 | A1 * | 3/2009 | Xu et al. | 704/207 |

FOREIGN PATENT DOCUMENTS

| | | | | |
|---|---|---|---|---|
| EP | 1684267 | | | 7/2006 |
| JP | 7319496 | A | | 12/1995 |
| JP | 9081189 | A | | 3/1997 |
| JP | 2002533772 | | | 10/2002 |
| JP | 2008533529 | | | 8/2008 |
| JP | 2008533530 | | | 8/2008 |
| RU | 2004121463 | | | 1/2006 |
| TW | 514867 | | | 12/2002 |
| TW | 548630 | | | 8/2003 |
| TW | I253056 | | | 4/2006 |
| WO | WO 0122403 | A1 | | 3/2001 |
| WO | WO 2005/078706 | | * | 8/2005 |
| WO | WO2005117366 | A1 | | 12/2005 |

OTHER PUBLICATIONS

Hammer, Florian. "Time-scale Modification using the Phase Vocoder." Diploma Thesis for Institute for Electronic Music and Acoustics, Graz University of Music and Dramatic Arts. Austria. Sep. 2001.*

Ilk, et al. "Adaptive time scale modification of speech for graceful degrading voice quality in congested networks for VoIP applicatons." Signal Processing 86, pp. 127-129. 2006.*

Gournay, et al.: "Performance Analysis of a Decoder-Based Time Scaling Algorithm for Variable Jitter Buffering of Speech Over Packet Networks," Acoustics, Speech and Signal Processing, 2006. ICASSP. IEEE International Conference, May 14, 2006, 19 XP010930105 Toulouse, France ISBN: 1-4244-0469-X.

International Search Report and Written Opinion—PCT/US2007/075284, International Searching Authority, European Patent Office—Feb. 19, 2008.

Tan, et al.: "A Time-Scale Modification Algorithm Based on the Subband Time-Domain Technique for Broad-Band Signal Applications," Journal of the Audio Engineering Society, Audio Engineering Society, New York, NY, US, vol. 48, No. 5, May 2000, pp. 437-449.

* cited by examiner

Time-Warping of Low-Band and High-Band

TIME-WARPING FRAMES OF WIDEBAND VOCODER

BACKGROUND

1. Field

This invention generally relates to time-warping, i.e., expanding or compressing, frames in a vocoder and, in particular, to methods of time-warping frames in a wideband vocoder.

2. Background

Time-warping has a number of applications in packet-switched networks where vocoder packets may arrive asynchronously. While time-warping may be performed either inside or outside the vocoder, performing it in the vocoder offers a number of advantages such as better quality of warped frames and reduced computational load.

SUMMARY

The invention comprises an apparatus and method of time-warping speech frames by manipulating a speech signal. In one aspect, a method of time-warping Code-Excited Linear Prediction (CELP) and Noise-Excited Linear Prediction (NELP) frames of a Fourth Generation Vocoder (4GV) wideband vocoder is disclosed. More specifically, for CELP frames, the method maintains a speech phase by adding or deleting pitch periods to expand or compress speech, respectively. With this method, the lower band signal may be time-warped in the residual, i.e., before synthesis, while the upper band signal may be time-warped after synthesis in the 8 kHz domain. The method disclosed may be applied to any wideband vocoder that uses CELP and/or NELP for the low band and/or uses a split-band technique to encode the lower and upper bands separately. It should be noted that the standards name for 4GV wideband is EVRC-C (Enhanced Variable Rate Codec C).

In view of the above, the described features of the invention generally relate to one or more improved systems, methods and/or apparatuses for communicating speech. In one embodiment, the invention comprises a method of communicating speech comprising time-warping a residual low band speech signal to an expanded or compressed version of the residual low band speech signal, time-warping a high band speech signal to an expanded or compressed version of the high band speech signal, and merging the time-warped low band and high band speech signals to give an entire time-warped speech signal. In one aspect of the invention, the residual low band speech signal is synthesized after time-warping of the residual low band signal while in the high band, synthesizing is performed before time-warping of the high band speech signal. The method may further comprise classifying speech segments and encoding the speech segments. The encoding of the speech segments may be one of code-excited linear prediction, noise-excited linear prediction or ⅛ (silence) frame coding. The low band may represent the frequency band up to about 4 kHz and the high band may represent the band from about 3.5 kHz to about 7 kHz.

In another embodiment, there is disclosed a vocoder having at least one input and at least one output, the vocoder comprising an encoder comprising a filter having at least one input operably connected to the input of the vocoder and at least one output; and a decoder comprising a synthesizer having at least one input operably connected to the at least one output of the encoder and at least one output operably connected to the at least one output of the vocoder. In this embodiment, the decoder comprises a memory, wherein the decoder is adapted to execute software instructions stored in the memory comprising time-warping a residual low band speech signal to an expanded or compressed version of the residual low band speech signal, time-warping a high band speech signal to an expanded or compressed version of the high band speech signal, and merging the time-warped low band and high band speech signals to give an entire time-warped speech signal. The synthesizer may comprise means for synthesizing the time-warped residual low band speech signal, and means for synthesizing the high band speech signal before time-warping it. The encoder comprises a memory and may be adapted to execute software instructions stored in the memory comprising classifying speech segments as ⅛ (silence) frame, code-excited linear prediction or noise-excited linear prediction.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION

The word "illustrative" is used herein to mean "serving as an example, instance, or illustration." Any embodiment described herein as "illustrative" is not necessarily to be construed as preferred or advantageous over other embodiments.

Time-warping has a number of applications in packet-switched networks where vocoder packets may arrive asynchronously. While time-warping may be performed either inside or outside the vocoder, performing it in the vocoder offers a number of advantages such as better quality of warped frames and reduced computational load. The techniques described herein may be easily applied to other vocoders that use similar techniques such as 4GV-Wideband, the standards name for which is EVRC-C, to vocode voice data.

Description of Vocoder Functionality

Human voices comprise of two components. One component comprises fundamental waves that are pitch-sensitive and the other is fixed harmonics that are not pitch sensitive. The perceived pitch of a sound is the ear's response to frequency, i.e., for most practical purposes the pitch is the frequency. The harmonics components add distinctive characteristics to a person's voice. They change along with the vocal cords and with the physical shape of the vocal tract and are called formants.

Figure 1:
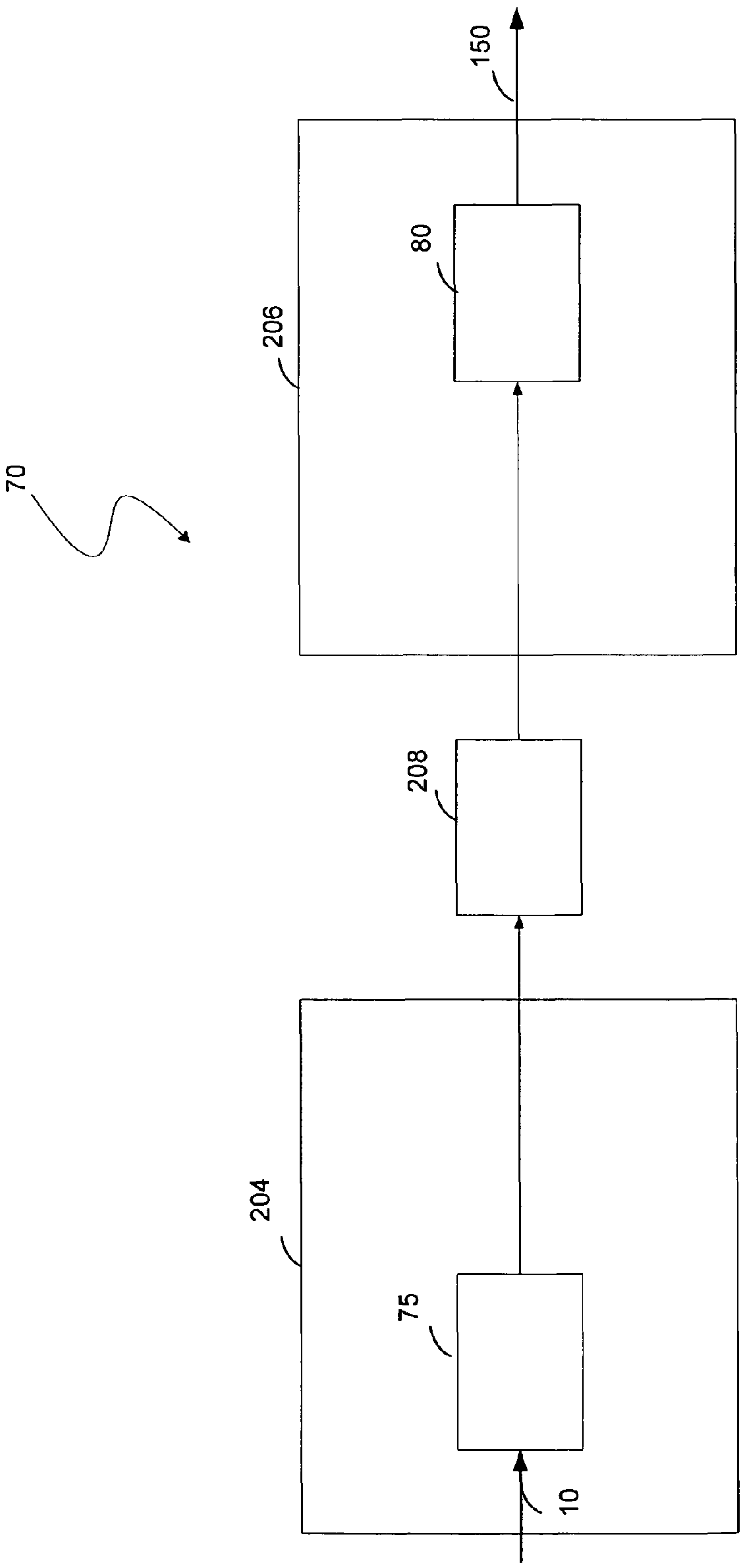
FIG. 1 is a block diagram of a Linear Predictive Coding (LPC) vocoder.
Figure 2A:
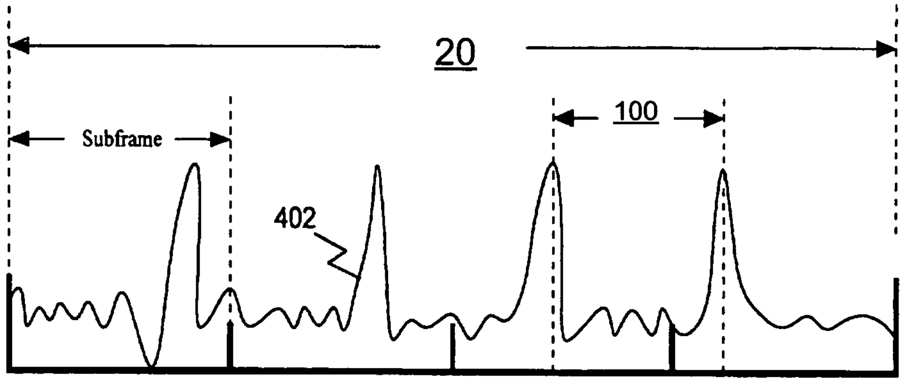
FIG. 2A is a speech signal containing voiced speech.
Figure 2B:
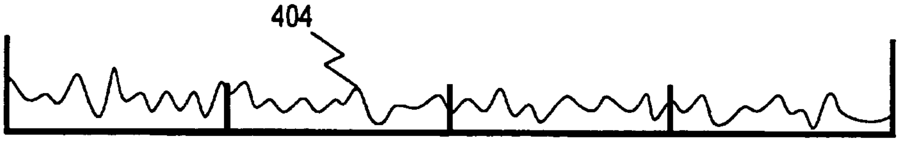
FIG. 2B is a speech signal containing unvoiced speech.
Figure 2C:
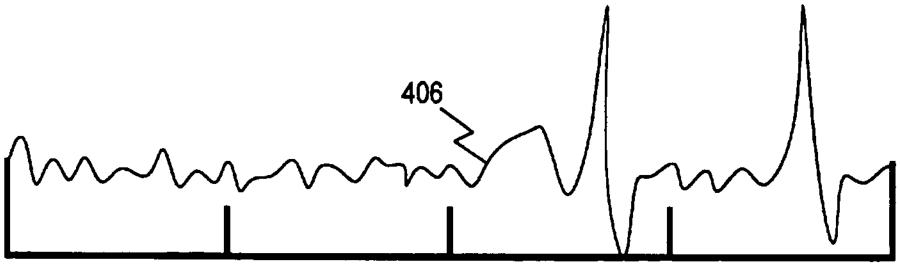
FIG. 2C is a speech signal containing transient speech.

Human voice may be represented by a digital signal s(n) 10 (see FIG. 1). Assume s(n) 10 is a digital speech signal obtained during a typical conversation including different vocal sounds and periods of silence. The speech signal s(n) 10 may be portioned into frames 20 as shown in FIGS. 2A-2C. In one aspect, s(n) 10 is digitally sampled at 8 kHz. In other aspects, s(n) 10 may be digitally sampled at 16 kHz or 32 kHz or some other sampling frequency.

Current coding schemes compress a digitized speech signal 10 into a low bit rate signal by removing all of the natural redundancies (i.e., correlated elements) inherent in speech. Speech typically exhibits short term redundancies resulting from the mechanical action of the lips and tongue, and long term redundancies resulting from the vibration of the vocal cords. Linear Predictive Coding (LPC) filters the speech signal 10 by removing the redundancies producing a residual speech signal. It then models the resulting residual signal as white Gaussian noise. A sampled value of a speech waveform may be predicted by weighting a sum of a number of past samples, each of which is multiplied by a linear predictive coefficient. Linear predictive coders, therefore, achieve a reduced bit rate by transmitting filter coefficients and quantized noise rather than a full bandwidth speech signal 10.

A block diagram of one embodiment of a LPC vocoder 70 is illustrated in FIG. 1. The function of the LPC is to minimize the sum of the squared differences between the original speech signal and the estimated speech signal over a finite duration. This may produce a unique set of predictor coefficients which are normally estimated every frame 20. A frame 20 is typically 20 ms long. The transfer function of a time-varying digital filter 75 may be given by:

$$H(z) = \frac{G}{1 - \sum a_k z^{-k}},$$

where the predictor coefficients may be represented by $a_k$ and the gain by G.

The summation is computed from k=1 to k=p. If an LPC-10 method is used, then p=10. This means that only the first 10 coefficients are transmitted to a LPC synthesizer 80. The two most commonly used methods to compute the coefficients are, but not limited to, the covariance method and the autocorrelation method.

Typical vocoders produce frames 20 of 20 msec duration, including 160 samples at the preferred 8 kHz rate or 320 samples at 16 kHz rate. A time-warped compressed version of this frame 20 has a duration smaller than 20 msec, while a time-warped expanded version has a duration larger than 20 msec. Time-warping of voice data has significant advantages when sending voice data over packet-switched networks, which introduce delay jitter in the transmission of voice packets. In such networks, time-warping may be used to mitigate the effects of such delay jitter and produce a "synchronous" looking voice stream.

Embodiments of the invention relate to an apparatus and method for time-warping frames 20 inside the vocoder 70 by manipulating the speech residual. In one embodiment, the present method and apparatus is used in 4GV wideband. The disclosed embodiments comprise methods and apparatuses or systems to expand/compress different types of 4GV wideband speech segments encoded using Code-Excited Linear Prediction (CELP) or (Noise-Excited Linear Prediction (NELP) coding.

The term "vocoder" 70 typically refers to devices that compress voiced speech by extracting parameters based on a model of human speech generation. Vocoders 70 include an encoder 204 and a decoder 206. The encoder 204 analyzes the incoming speech and extracts the relevant parameters. In one embodiment, the encoder comprises the filter 75. The decoder 206 synthesizes the speech using the parameters that it receives from the encoder 204 via a transmission channel 208. In one embodiment, the decoder comprises the synthesizer 80. The speech signal 10 is often divided into frames 20 of data and block processed by the vocoder 70.

Those skilled in the art will recognize that human speech may be classified in many different ways. Three conventional classifications of speech are voiced, unvoiced sounds and transient speech.

FIG. 2A is a voiced speech signal s(n) 402. FIG. 2A shows a measurable, common property of voiced speech known as the pitch period 100.

FIG. 2B is an unvoiced speech signal s(n) 404. An unvoiced speech signal 404 resembles colored noise.

FIG. 2C depicts a transient speech signal s(n) 406, i.e., speech which is neither voiced nor unvoiced. The example of transient speech 406 shown in FIG. 2C might represent s(n) transitioning between unvoiced speech and voiced speech. These three classifications are not all inclusive. There are many different classifications of speech that may be employed according to the methods described herein to achieve comparable results.

4GV Wideband Vocoder

The fourth generation vocoder (4GV) provides attractive features for use over wireless networks as further described in co-pending patent application Ser. No. 11/123,467, filed on May 5, 2005, entitled "Time Warping Frames Inside the Vocoder by Modifying the Residual," which is fully incorporated herein by reference. Some of these features include the ability to trade-off quality vs. bit rate, more resilient vocoding in the face of increased packet error rate (PER), better concealment of erasures, etc. In the present invention, the 4GV wideband vocoder is disclosed that encodes speech using a split-band technique, i.e., the lower and upper bands are separately encoded.

In one embodiment, an input signal represents wideband speech sampled at 16 kHz. An analysis filterbank is provided generating a narrowband (low band) signal sampled at 8 kHz, and a high band signal sampled at 7 kHz. This high band signal represents the band from about 3.5 kHz to about 7 kHz in the input signal, while the low band signal represents the band up to about 4 kHz, and the final reconstructed wideband signal will be limited in bandwidth to about 7 kHz. It should be noted that there is an approximately 500 Hz overlap between the low and high bands, allowing for a more gradual transition between the bands.

In one aspect, the narrowband signal is encoded using a modified version of the narrowband EVRC-B speech coder, which is a CELP coder with a frame size of 20 milliseconds. Several signals from the narrowband coder are used by the high band analysis and synthesis; these are: (1) the excitation (i.e., quantized residual) signal from the narrowband coder; (2) the quantized first reflection coefficient (as an indicator of the spectral tilt of the narrowband signal); (3) the quantized adaptive codebook gain; and (4) the quantized pitch lag.

The modified EVRC-B narrowband encoder used in 4GV wideband encodes each frame voice data in one of three different frame types: Code-Excited Linear Prediction (CELP); Noise-Excited Linear Prediction (NELP); or silence ⅛$^{th}$ rate frame.

CELP is used to encode most of the speech, which includes speech that is periodic as well as that with poor periodicity. Typically, about 75% of the non-silent frames are encoded by the modified EVRC-B narrowband encoder using CELP.

NELP is used to encode speech that is noise-like in character. The noise-like character of such speech segments may be reconstructed by generating random signals at the decoder and applying appropriate gains to them.

⅛$^{th}$ rate frames are used to encode background noise, i.e., periods where the user is not talking.

Time-Warping 4GV Wideband Frames

Since the 4GV wideband vocoder encodes lower and upper bands separately, the same philosophy is followed in time-warping the frames. The lower band is time-warped using a similar technique as described in the above-mentioned co-pending patent application entitled "Time Warping Frames Inside the Vocoder by Modifying the Residual."

Figure 3:
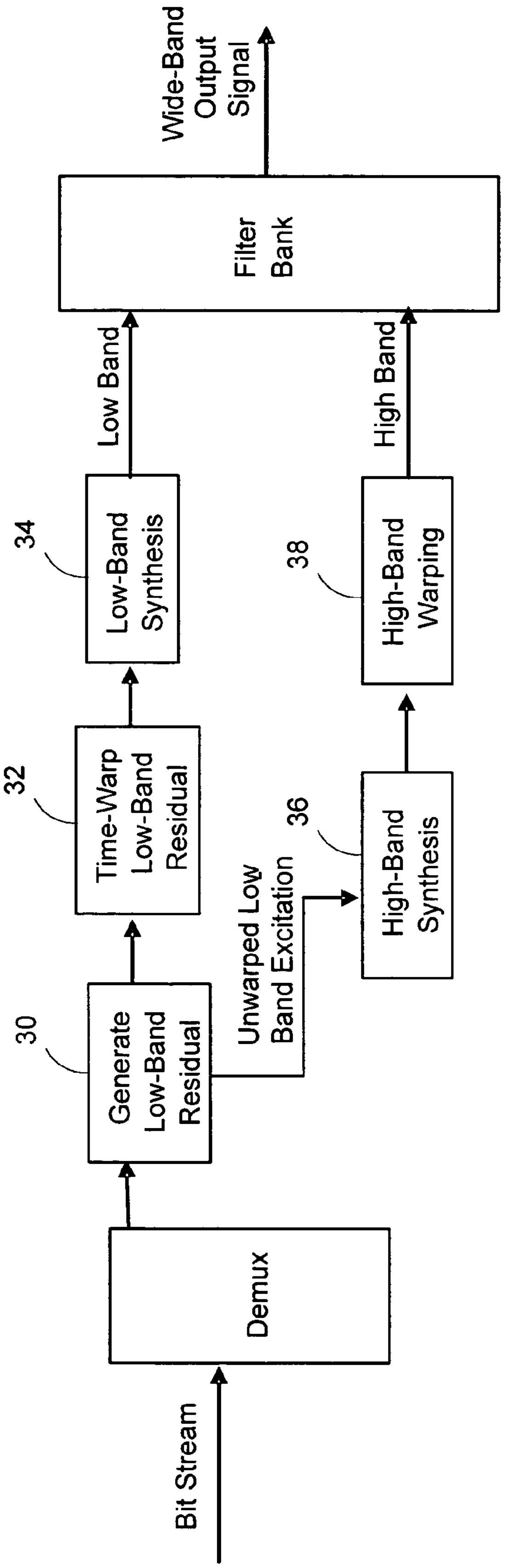
FIG. 3 is a block diagram illustrating time-warping of low band and high band.

Referring to FIG. 3, there is shown a lower-band warping 32 that is applied on a residual signal 30. The main reason for doing time-warping 32 in the residual domain is that this allows the LPC synthesis 34 to be applied to the time-warped residual signal. The LPC coefficients play an important role in how speech sounds and applying synthesis 34 after warping 32 ensures that correct LPC information is maintained in the signal. If time-warping is done after the decoder, on the other hand, the LPC synthesis has already been performed before time-warping. Thus, the warping procedure may change the LPC information of the signal, especially if the pitch period estimation has not been very accurate.

Time-Warping of Residual Signal when Speech Segment is CELP

In order to warp the residual, the decoder uses pitch delay information contained in the encoded frame. This pitch delay is actually the pitch delay at the end of the frame. It should be noted here that even in a periodic frame, the pitch delay might be slightly changing. The pitch delays at any point in the frame may be estimated by interpolating between the pitch delay of the end of the last frame and that at the end of the current frame. This is shown in FIG. 4. Once pitch delays at all points in the frame are known, the frame may be divided into pitch periods. The boundaries of pitch periods are determined using the pitch delays at various points in the frame.

Figure 4A:
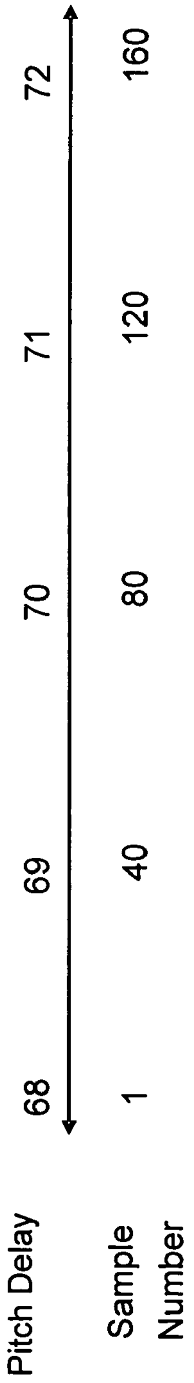
FIG. 4A depicts determining pitch delays through interpolation.
Figure 4B:
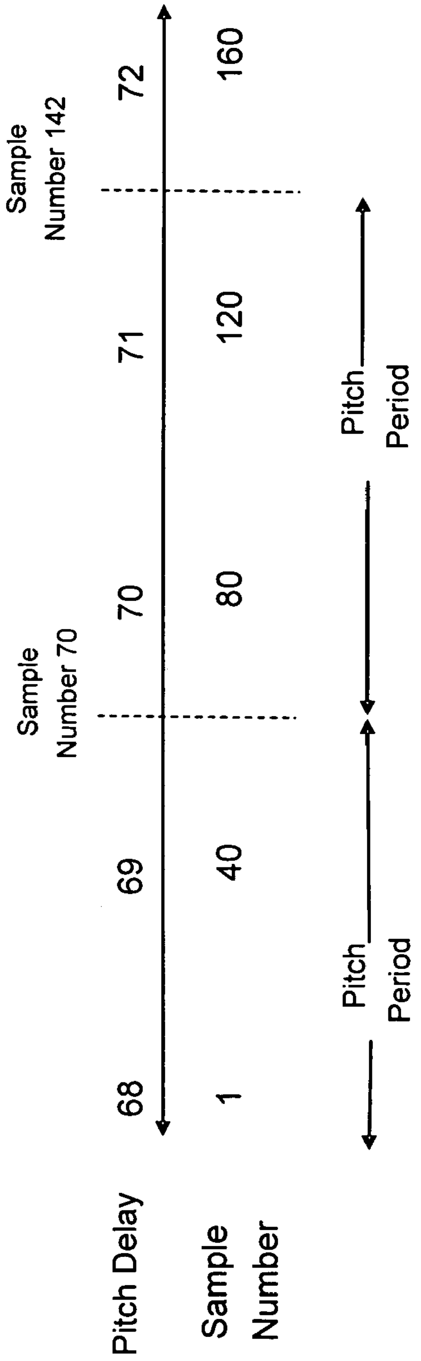
FIG. 4B depicts identifying pitch periods.

FIG. 4A shows an example of how to divide the frame into its pitch periods. For instance, sample number 70 has pitch delay of approximately 70 and sample number 142 has pitch delay of approximately 72. Thus, pitch periods are from [1-70] and from [71-142]. This is illustrated in FIG. 4B.

Once the frame has been divided into pitch periods, these pitch periods may then be overlap/added to increase/decrease the size of the residual. The overlap/add technique is a known technique and FIGS. 5A-5C show how it is used to expand/compress the residual.

Alternatively, the pitch periods may be repeated if the speech signal needs to be expanded. For instance, in FIG. 5B, pitch period PP1 may be repeated (instead of overlap added overlap/added with PP2) to produce an extra pitch period.

Moreover, the overlap/adding and/or repeating of pitch periods may be done as many times as is required to produce the amount of expansion/compression required.

Figure 5A:
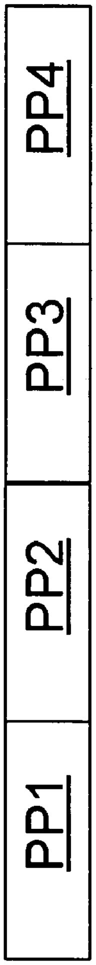
FIG. 5A represents an original speech signal in the form of pitch periods.
Figure 5B:
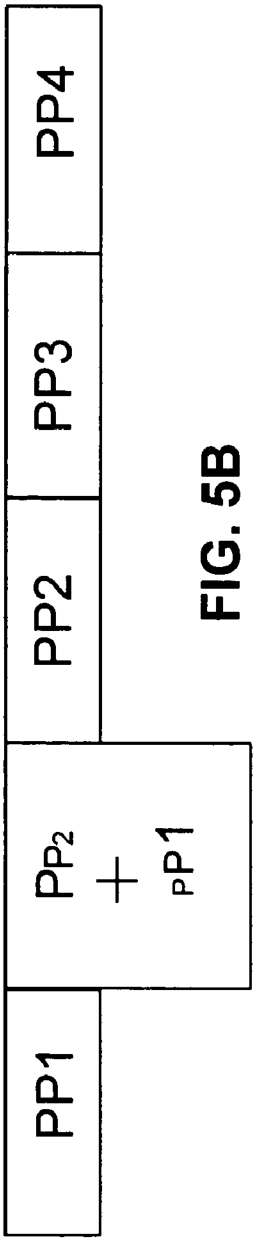
FIG. 5B represents a speech signal expanded using overlap/add.
Figure 5C:
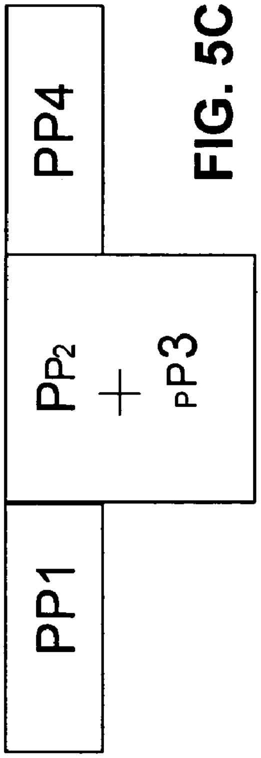
FIG. 5C represents a speech signal compressed using overlap/add.

Referring to FIG. 5A, the original speech signal comprising of 4 pitch periods (PPs) is shown. FIG. 5B shows how this speech signal may be expanded using overlap/add. In FIG. 5B, pitch periods PP2 and PP1 are overlap/added such that PP2s contribution goes on decreasing and that of PP1 is increasing. FIG. 5C illustrates how overlap/add is used to compress the residual.

In cases when the pitch period is changing, the overlap/add technique may require the merging of two pitch periods of unequal length. In this ease, better merging may be achieved by aliening the peaks of the two pitch periods before overlap/adding them.

The expanded/compressed residual is finally sent through the LPC synthesis.

Once the lower band is warped, the upper band needs to be warped using the pitch period from the lower band, i.e., for expansion, a pitch period of samples is added, while for compressing, a pitch period is removed.

The procedure for warping the upper band is different from the lower band. Referring back to FIG. 3, the upper band is not warped in the residual domain, but rather warping 38 is done after synthesis 36 of the upper band samples. The reason for this is that the upper band is sampled at 7 kHz, while the lower band is sampled at 8 kHz. Thus, the pitch period of the lower band (sampled at 8 kHz) may become a fractional number of samples when the sampling rate is 7 kHz, as in the upper band. As an example, if the pitch period is 25 in the lower band, in the upper band's residual domain, this will require 25*⅞=21.875 samples to be added/removed from the upper band's residual. Clearly, since a fractional number of samples cannot be generated, the upper band is warped 38 after it has been resampled to 8 kHz, which is the case after synthesis 36.

Once the lower band is warped 32, the unwarped lower band excitation (consisting of 160 samples) is passed to the upper band decoder. Using this unwarped lower band excitation, the upper band decoder produces 140 samples of upper band at 7 kHz. These 140 samples are then passed through a synthesis filter 36 and resampled to 8 kHz, giving 160 upper band samples.

These 160 samples at 8 kHz are then time-warped 38 using the pitch period from the lower band and the overlap/add technique used for warping the lower band CELP speech segment.

The upper and lower bands are finally added or merged to give the entire warped signal.

Time-Warping of Residual Signal when Speech Segment is NELP

For NELP speech segments, the encoder encodes only the LPC information as well as the gains of different parts of the speech segment for the lower band. The gains may be encoded in "segments" of 16 PCM samples each. Thus, the lower band may be represented as 10 encoded gain values (one each for 16 samples of speech).

The decoder generates the lower band residual signal by generating random values and then applying the respective gains on them. In this case, there is no concept of pitch period and as such, the lower band expansion/compression does not have to be of the granularity of a pitch period.

In order to expand/compress the lower band of a NELP encoded frame, the decoder may generate a larger/smaller number of segments than 10. The lower band expansion/compression in this case is by a multiple of 16 samples, leading to N=16*n samples, where n is the number of segments. In case of expansion, the extra added segments can take the gains of some function of the first 10 segments. As an example, the extra segments may take the gain of the 10$^{th}$ segment.

Alternately, the decoder may expand/compress the lower band of a NELP encoded frame by applying the 10 decoded gains to sets of y (instead of 16) samples to generate an expanded (y>16) or compressed (y<16) lower band residual.

The expanded/compressed residual is then sent through the LPC synthesis to produce the lower band warped signal.

Once the lower band is warped, the unwarped lower band excitation (comprising of 160 samples) is passed to the upper band decoder. Using this unwarped lower band excitation, the upper band decoder produces 140 samples of upper band at 7 kHz. These 140 samples are then passed through a synthesis filter and resampled to 8 kHz, giving 160 upper band samples.

These 160 samples at 8 kHz are then time-warped in a similar way as the upper band warping of CELP speech segments, i.e., using overlap/add. When using overlap/add for the upper-band of NELP, the amount to compress/expand is the same as the amount used for the lower band. In other words, the "overlap" used for the overlap/add method is assumed to be the amount of expansion/compression in the lower band. As an example, if the lower band produced 192 samples after warping, the overlap period used in the overlap/add method is 192−160=32 samples.

The upper and lower bands are finally added to give the entire warped NELP speech segment.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A method of communicating speech, comprising:

time-warping a residual low band speech signal to an expanded or compressed version of the residual low band speech signal;

time-warping a high band speech signal to an expanded or compressed version of the high band speech signal, wherein the time-warping of the high band speech signal comprises:

determining a plurality of pitch periods from the residual low band speech signal;

overlap/adding one or more pitch periods of the high band speech signal if the high band speech signal is compressed, using the pitch periods from the residual low band speech signal; and overlap/adding or repeating one or more pitch periods of the high band speech signal if the high band speech signal is expanded, using the pitch periods from the residual low band speech signal; and merging a synthesized version of the time-warped residual low band and the time-warped high band speech signals to give an entire time-warped speech signal.

2. The method of claim 1, further comprising synthesizing the time-warped residual low band speech signal.

3. The method of claim 2, further comprising synthesizing the high band speech signal before time-warping it.

4. The method of claim 3, further comprising:

classifying speech segments; and encoding the speech segments.

5. The method of claim 4, wherein encoding the speech segments comprises using code-excited linear prediction, noise-excited linear prediction or ⅛ frame coding.

6. The method of claim 4, wherein the encoding is code-excited linear prediction encoding.

7. The method of claim 6, wherein the time-warping of the residual low band speech signal comprises:

estimating at least one pitch period; and adding or subtracting at least one of the pitch periods after receiving the residual low band speech signal.

8. The method of claim 6, wherein the time-warping of the residual low band speech signal comprises:

estimating pitch delay;

dividing a speech frame into pitch periods, wherein boundaries of the pitch periods are determined using the pitch delay at various points in the speech frame;

overlap/adding the pitch periods if the residual low band speech signal is compressed; and overlap/adding or repeating one or more pitch periods if the residual low band speech signal is expanded.

9. The method of claim 8, wherein the estimating of the pitch delay comprises interpolating between a pitch delay of an end of a last frame and an end of a current frame.

10. The method of claim 8, wherein the overlap/adding or repeating one or more of the pitch periods comprises merging the speech segments.

11. The method of claim 10, further comprising selecting similar speech segments, wherein the similar speech segments are merged.

12. The method of claim 10, further comprising correlating the speech segments, whereby similar speech segments are selected.

13. The method of claim 8, wherein the overlap/adding or repeating one or more of the pitch periods if the residual low band speech signal is expanded comprises adding an additional pitch period created from a first pitch segment and a second pitch period segment.

14. The method of claim 13, wherein the adding of an additional pitch period created from a first pitch segment and a second pitch period segment comprises adding the first and second pitch segments such that the first pitch period segment's contribution increases and the second pitch period segment's contribution decreases.

15. The method of claim 1, wherein the low band represents the band up to and including 4 kHz.

16. The method of claim 1, wherein the high band represents the band from about 3.5 kHz to about 7 kHz.

17. A vocoder having at least one input and at least one output, comprising:

an encoder comprising a filter having at least one input operably connected to the input of the vocoder and at least one output; and a decoder comprising:

a synthesizer having at least one input operably connected to the at least one output of the encoder and at least one output operably connected to the at least one output of the vocoder; and a memory, wherein the decoder is adapted to execute software instructions stored in the memory comprising:

time-warping a residual low band speech signal to an expanded or compressed version of the residual low band speech signal;

time-warping a high band speech signal to an expanded or compressed version of the high band speech signal, wherein the time-warping software instruction of the high band speech signal comprises:

determining a plurality of pitch periods from the residual low band speech signal, overlap/adding one or more pitch periods of the high band speech signal if the high band speech signal is compressed, using the pitch periods from the residual low band speech signal; and overlap/adding or repeating one or more pitch periods of the high band speech signal if the high band speech signal is expanded, using the pitch periods from the residual low band speech signal; and merging a synthesized version the time-warped residual low band and the time-warped high band speech signals to give an entire time-warped speech signal.

18. The vocoder of claim 17, wherein the synthesizer comprises means for synthesizing the time-warped residual low band speech signal.

19. The vocoder of claim 18, wherein the synthesizer further comprises means for synthesizing the high band speech signal before time-warping it.

20. The vocoder of claim 19, wherein the encoder comprises a memory and the encoder is adapted to execute software instructions stored in the memory comprising encoding speech segments using code-excited linear prediction encoding.

21. The vocoder of claim 20, wherein the time-warping software instruction of the high band speech signal comprises:

overlap/adding the same number of samples as were compressed in the lower band if the high band speech signal is compressed; and overlap/adding the same number of samples as were expanded in the lower band if the high band speech signal is expanded.

22. The vocoder of claim 20, wherein the time-warping software instruction of the residual low band speech signal comprises:

estimating at least one pitch period; and adding or subtracting the at least one pitch period after receiving the residual low band speech signal.

23. The vocoder of claim 20, wherein the time-warping software instruction of the residual low band speech signal comprises:

estimating pitch delay;

dividing a speech frame into pitch periods, wherein boundaries of the pitch periods are determined using the pitch delay at various points in the speech frame;

overlap/adding the pitch periods if the residual speech signal is compressed; and overlap/adding or repeating one or more pitch periods if the residual speech signal is expanded.

24. The vocoder of claim 23, wherein the overlap/adding instruction of the pitch periods if the residual low band speech signal is compressed comprises:

segmenting an input sample sequence into blocks of samples;

removing segments of the residual signal at regular time intervals;

merging the removed segments; and replacing the removed segments with a merged segment.

25. The vocoder of claim 24, wherein the merging instruction of the removed segments comprises increasing a first pitch period segment's contribution and decreasing a second pitch period segment's contribution.

26. The vocoder of claim 23, wherein the estimating instruction of the pitch delay comprises interpolating between a pitch delay of an end of a last frame and an end of a current frame.

27. The vocoder of claim 23, wherein the overlap/adding or repeating one or more of the pitch periods instruction comprises merging the speech segments.

28. The vocoder of claim 27, further comprising selecting similar speech segments, wherein the similar speech segments are merged.

29. The vocoder of claim 27, wherein the time-warping instruction of the residual low band speech signal further comprises correlating the speech segments, whereby similar speech segments are selected.

30. The vocoder of claim 23, wherein the overlap/adding or repeating one or more of the pitch periods instruction if the residual low band speech signal is expanded comprises adding an additional pitch period created from a first pitch period segment and a second pitch period segment.

31. The vocoder of claim 30, wherein the adding instruction of an additional pitch period created from the first and second pitch period segments comprises adding the first and second pitch period segments such that the first pitch period segment's contribution increases and the second pitch period segment's contribution decreases.

32. The vocoder of claim 17, wherein the encoder comprises a memory and the encoder is adapted to execute software instructions stored in the memory comprising classifying speech segments as ⅛ frame, code-excited linear prediction or noise-excited linear prediction.

33. The vocoder of claim 17, wherein the low band represents the band up to and including 4 kHz.

34. The vocoder of claim 17, wherein the high band represents the band from about 3.5 kHz to about 7 kHz.

35. An apparatus configured to communicate speech, said apparatus comprising:

means for time-warping a residual low band speech signal to an expanded or compressed version of the residual low band speech signal;

means for time-warping a high band speech signal to an expanded or compressed version of the high band speech signal, wherein the time-warping of the high band speech signal comprises:

means for determining a plurality of pitch periods from the residual low band speech signal;

means for overlapping/adding one or more pitch periods of the high band speech signal if the high band speech signal is compressed, using the pitch periods from the residual low band speech signal; and means for overlapping/adding or repeating one or more pitch periods of the high band speech signal if the high band speech signal is expanded, using the pitch periods from the residual low band speech signal; and means for merging a synthesized version of the time-warped residual low band and the time-warped high band speech signals to give an entire time-warped speech signal.

36. A non-transitory computer-readable medium having machine-readable instructions performing the method according to claim 1.

* * * * *